Feb. 22, 1949.   G. T. JOHNSON   2,462,749
LIGHT CONDENSER FOR PICTURE PROJECTION UNITS
Filed June 27, 1945
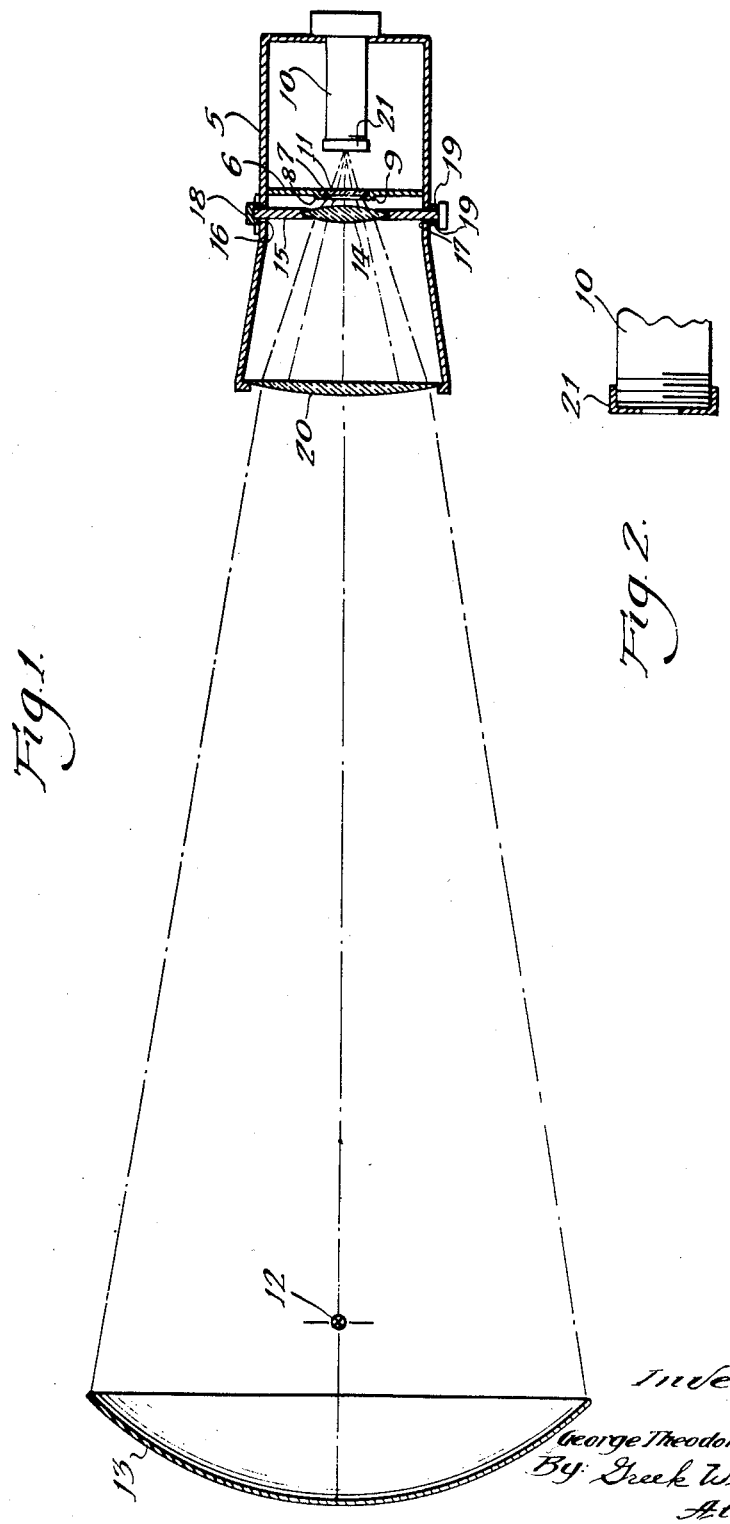

Patented Feb. 22, 1949

2,462,749

UNITED STATES PATENT OFFICE 2,462,749

LIGHT CONDENSER FOR PICTURE PROJECTION UNITS

George Theodore Johnson, Chicago, Ill.

Application June 27, 1945, Serial No. 601,811

4 Claims. (Cl. 88—24)

My invention relates to the projection of pictures. It is particularly concerned with improvements in light transmission for a picture projector. It is applicable alike to projection printing, picture screen projection, etc. It may be applied readily to so-called "moving" pictures and "still" pictures of various sizes including the standard 35 mm., 16 mm. and 8 mm. projectors.

The principal object of my invention is to improve the transmission of light in the projector in such a way as to produce projected pictures wherein improved depth and perspective is attained so that each object in the picture appears in more natural contour and relief. According to my invention these results are attained with pictures, photographed in the customary manner. The invention is not limited to any particular method of taking the picture which is to be projected.

It is a further purpose of my invention to provide means to obtain projected pictures which are clearer in detail and definition than the projected pictures from the present types of projection units.

Another purpose is to provide means to prevent stray light such as the red flame above an arc from affecting the projected picture.

My invention contemplates an improved projection unit wherein I may use the usual light source and a condenser lens, or the usual combination of a light reflector in back of the light source or both. It is essential to gather and condense, or converge, all possible light from the light source.

According to the preferred form of my invention I use a reflector which is so arranged as to gather the light and concentrate it upon a condenser lens which is adapted, in cooperation with the picture and a projection lens, to produce the improved results mentioned before. The function of the improved unit is to converge the light, after it has passed through the picture frame, into a sharp pointed cone so that only a small spot of light, which contains the entire picture image, strikes the first, or posterior, element of the projector lens. This small spot of light contains substantially all the light which passes through each picture being projected. This results in the projection lens getting only a one angled view of the whole picture, with all of the light possible from the light source. In other words the projection lens, "sees" each complete picture from only one narrow angle of view. This in turn emphasizes and enhances the depth and perspective of each scene and shows each object and person in a more rounded contour.

The nature and advantages of my invention will appear more fully from the following description and the accompanying drawings of a preferred embodiment of the invention. The drawings are somewhat diagrammatic since the details of the projector mechanism including the means for moving film, focusing the projector lens, etc., are not generally affected by the use of my invention in a projector. It should be understood also that the drawings and description are for the purposes of illustration and should not be considered as limiting the scope of the invention except as it is limited by the claims.

In the drawings;

Figure 1 is a diagrammatic plan sectional view of a projector embodying my invention and Figure 2 is a fragmentary showing of a projection lens attachment which I employ to further the purpose of my invention.

It is not new in projectors to use a combination of a light source, a reflector and a condenser lens. However, my invention resides in providing a new relation between two or all of these elements and the projector lens whereby greater utilization of light from the source results and whereby the projected image has greater depth and clarity. In order to accomplish these results the relations of the parts remain essentially the same for all sizes of projectors although of course actual sizes and spacing of parts are varied to fit the size of picture from which projection is made. With this brief explanation I refer to the drawings wherein the numeral 5 indicates a projector frame which is shown only diagrammatically. This frame carries a film guide 6 which has a light aperture or window 7 of the proper size and which has film tracks 8 and 9 along which the film is guided by the usual film shoe (not shown). The projector has a projection lens 10 which, according to known practices, is adjustable, properly to focus the picture upon the screen. The particular nature of the projection lens and its spacing and adjustability with respect to the film 11 (shown greatly exaggerated in thickness) are not a part of my invention although these facts are taken into account in the application of my invention to a particular projector. The projector includes a light source 12, such as a carbon arc. It includes a reflector 13. In practice of course the light source and reflector are suitably housed like they are in standard projectors. My invention utilizes a light condensing lens which may have any suitable optical construction to meet the requirements hereinafter set forth. As shown the condensing lens 14 is a convex lens. It is mounted in a holder 15 which may for certain adaptations be removably mounted in the projector housing. The housing is slotted at 16 and 17 to receive the holder. A socket 18 is provided over the slot 16, and two strips 19 serve to cover the slot 17 when the condensing lens 14 is in position. A second condensing lens 20, which is much larger than condensing lens 14, may be used where necessary to converge the light rays properly upon the lens 14, especially in projectors using no light reflector behind light source.

Now in regard to the critical relations of the parts it is possible to use a relatively large reflector. In a projector for 35 mm. film I use a reflector at least about twelve inches in diameter. It may be a spherical reflector or a parabolic reflector and it is set far enough back of the light source to direct most of the light striking it in a converging beam toward the projector housing. For example a reflector having a nine inch radius desirably should be about twelve to thirteen inches across and its center should lie about four and one-half inches to the rear of the light source. The large condenser lens is provided to catch more of the direct light from the source and converge it along with the reflected light upon the lens 14. This lens need be only large enough that the converging rays from it will cover the entire picture window or a picture on the film. The particular nature of the lens 14 is not important so long as it is capable of converging the light beam in the proper manner. For example a plano-convex lens with curvature of two inch to four inch radius or a double convex lens with total curvatures within the limits designated, or other equivalent lens structures may be used.

The positioning of the condenser lens 14 with respect to the picture is very close. It is preferably placed less thna one and one-half inches from the picture and I obtain the best results when I place the lens between one-half inch and one inch from the picture. The size of the lens 14 must be large enough that the cone of light from it covers the picture. The particular mounting of the lens 14 is such that the lens is centered upon the light axis from the light source to the axis of the condenser lens. In applying the invention to old projectors now in use it is necessary to slot the projector housing or provide some other efficient means for placing the lens 14 in the proper position.

In many instances it may not be advisable to use the lens 20. However, its use is of advantage in obtaining a greater concentration of light, especially if no reflector is used.

The lens 14 is adapted to concentrate the light upon the posterior element of the projection lens. Preferably the cone of light from the lens 14 through the picture should reach its apex at or immediately adjacent to the said posterior element. This gives the projection lens the "one-angled" view of the picture to which reference has heretofore been made. In actual practice it is desirable to have the apex of the cone of light either at the face of or within a quarter of an inch inside the posterior element of the projection lens. In many cases the lens is adjusted toward and away from the picture. According to my invention I find that it is practical to have the diameter of the cone of light equal to or less than one fourth the diagonal of the picture where the cone of light meets the face of the posterior element of the lens.

For certain types of light sources it is essential, in order to avoid false display or coloring of the projected image, to limit the area of the projection lens to be exposed to the light. For instance in a carbon arc light source there is often a reddish flame spaced above the arc a slight distance. With my invention this reddish flame may be prevented from affecting the projected image by restricting the exposed part of the posterior element of the projection lens. Figure 2 of the drawings illustrates one way of accomplishing this result. In this figure the projection lens is provided with a mask 21 over the rear end. This mask 21 has an aperture the diameter of which must be no greater than three-fourths the larger dimension of the picture window. It must be large enough not to cut off any of the light of the projected cone from the light source through the lens 14. The projection lens barrel is shown threaded to receive the apertured mask. Since the stray red light which causes the difficulty is not on the axis line of the reflector, light source, and condenser lens it will be offset from the main concentration of light at the posterior element of the lens and may thus be screened out.

The actual dimensions heretofore given are for projectors using 35 mm. film. These dimensions must be scaled down in projectors for reduced sizes of film. Naturally a 16 mm. or an 8 mm. projector will require smaller reflectors, condenser lens and light cones. Furthermore, variations in one element are reflected in the others. Some of the relations which have to be maintained are brought out in the following discussion.

(1) The reflector must be of the proper diameter and concave curvature. The larger its diameter the more light it will magnify but at the same time the larger will be the apex of the cone of light it converges; i. e., the larger will be the image of the light source at said apex of cone of light. However, condenser lenses as utilized and installed in accordance with my invention will not only shorten the focal length of said reflector but also reduce in size said apex of cone of light, or said image of light source, down to the desired small diameter.

The deeper the concavity of said reflector; i. e., the shorter the radius; the shorter will be its focal length, where the apex of its light cone is smallest. Likewise, the deeper the reflector concavity the smaller will be said apex, although unaided by a condenser lens it still will not be small enough to accomplish the maximum results aimed at in this invention.

(2) The size of the apex of the light cone should be in proportion to the size of film which is being used in the projector. Obviously the smaller size; in width; films requires a much smaller apex than the larger sizes, because the effects desired are only produced in the degree or proportion that said apex is narrowed down to the smallest possible size, while at the same time using as large a reflector as is practical in order to utilize all the light possible from the light source. Furthermore, if the said apex of light cone is to remain substantially one quarter the diameter or diagonal of the size of the film frame, it is obvious that in the case of an 8 mm. picture projector, for example, the apex of the light cone should only be 2 mm. in diameter, or diagonal. At the same time said apex of light should contain all the light possible from the light source.

While it is true that the posterior element of the projection lens can be either masked off, with a hole in the middle of the desired size for each size film being used, or said posterior element of the projection lens may be cut or made of substantially one fourth the diameter, or diagonal, of the size film being projected, yet this should be done only to shut out stray rays of light and not to cut off any substantial amount of the strong rays.

(3) Said reflector should be installed at the proper distance behind light source; depending on the distance said light source is from the condenser lens(es) or film frame. The closer said reflector is placed to said light source the more spread out the cone of light is, or the longer its focal length becomes. In order to utilize a maximum amount of light it is important that said distance be such that the diameter, or diagonal, of the cone of light thrown by the reflector as it strikes the condenser lens, or the posterior condenser lens, in projectors which utilize more than one condenser lens, is slightly larger than the diameter of said reflector's own focused image of the core; or strong rays, of the light source.

The distance between said reflector and light source is also governed by the radius of concavity of said reflector. For example, the larger the radius of concavity of the reflector the longer will be its focal length and the smaller will be the taper to its cone of light, and, the larger will be the diameter, or diagonal, of its light cone at a given distance than would be the case with a reflector of smaller radius of concavity. Obviously, the deeper the concavity of said reflector the smaller must be its diameter, which in turn diminishes the amount of light which it is able to pick up from the light source and direct to a useful point.

(4) Said light source must be placed at the proper distance from the condenser so that said condenser lens will pick up and converge a maximum amount of light. Its flame or illuminating filament should be as small as possible but give maximum light.

(5) Said condenser lens must be of the proper convex curvature to carry out the stated objects of this invention. For example, if a large posterior condenser is used, it should be of a large enough radius of convex curvature to throw a cone of light on the anterior condenser lens element which is slightly larger in diameter, or diagonal, than the image of the light source; whether focused by a large anterior condenser lens alone, or in conjunction with a reflector back of light source.

It is obvious that several condenser lenses may be utilized, instead of only one or two, although the more condenser lens elements used the more the light will be cut down. Also the larger radius of convex curvature must obtain in said condenser lenses. For example, instead of only one posterior condenser lens element, two or more may be utilized, one or more of which may have plano, or even concave sides if the convex curvatures more than offset said concave surfaces to the extent of carrying out the aims of this invention.

Said anterior condenser lens must be of the proper convex curvature and diameter, so that if placed slightly rearward, toward light source, of the film frame, it will converge the light cone passing through it in such a manner that it first passes through the film frame with a diameter, or diagonal, slightly greater than that of said film frame, and then causes said light cone to converge down to a small apex within a short distance, so that as said apex of light cone strikes the posterior element of the projection lens it is at or extremely near its smallest diameter, or diagonal. Said apex should not occur ahead, i. e., toward picture frame of the posterior projection lens element.

The distance between film frame and posterior element of the projection lens is largely governed (a) by the nature of the projection lens, (b) by the length of the image throw from projector to screen and (c) the size picture thrown on screen.

While this invention does not seek to alter the nature of the conventional picture projection lenses, other than mask off most of the surface of its posterior element, it allows for the differences in said projection lenses, the elements, distances, and sizes of elements which concern this invention can either be governed by the distance said projection lenses are placed from the film frame, or by different distances which may obtain with special projection lenses, either now devised or to be devised in the future.

Therefore this invention is flexible enough to cover both existing types of projection lenses or others which might be mounted either closer or further from the film frame than is now customary.

(6) Said anterior element of the condenser lens must be placed at the proper distance rearward, toward light source, from the film frame, generally speaking, very close, about a half inch in the larger size projectors, although slightly more than this if a condenser lens is used of a large enough diameter, or diagonal, and of not too small a radius of convex curvature, perhaps slightly closer in the smaller size projectors.

(7) Said posterior condenser lens should be considerably larger, in diameter or diagonal, in projectors in which no reflector, placed rearward of the light source, is utilized, so as to pick up and converge all the light possible from the light source. In fact, as intimated, it is not essential to use more than one comparatively small condenser lens, which is placed close to the picture frame, if said reflector is used.

If no reflector is used it is possible to converge the light cone down to a smaller apex, although some intensity of the light is thereby sacrificed unless the posterior condenser lens is extremely large; in fact as large as the physical dimensions of the lamp house will permit, said lamphouse being preferably in such cases made as large as is practicable.

It is important to either bevel or mask off the outside edges of said posterior condenser lens, to prevent said lens from casting a reddish ring around its light cone.

(8) In the smaller sizes of projectors, such as the 16 mm. and 8 mm. it is important to use a light-converging reflector, the same type as is used in the 35 mm. projectors, instead of the present type of reflector which only magnifies, but does not converge, the light down to a tapered cone; said reflectors spaced behind the light source the proper distance so as to focus the light source image substantially at the face of the condenser lens, instead of failing to do so, as in present practice.

Having thus described my invention I claim:

1. A projector comprising in combination, a picture support, a projection lens spaced therefrom, a light source, and means for directing the light from said source through the picture to the posterior element of the projection lens, said means comprising condenser lens means in close juxtaposition to the picture on the side of the picture toward the light, the convexity of the condenser lens means being such that it directs the light in a converging path from the entire area of the picture to an apex substantially at the surface of the posterior element of the projection lens, and a mask restricting the exposed portion of the posterior end of the projection lens to dimensions less than three fourths the dimensions of the picture.

2. A projector constructed to project moving pictures of more than 16 mm. in width, comprising in combination, a picture support, a projection lens spaced therefrom, a light source, and means for directing the light from said source through the picture to the posterior element of the projection lens, said means comprising a condenser lens spaced less than three inches from the picture on the side thereof toward the light source, and a concave reflector rearwardly of the light source reflecting light from said source in a converging path which substantially covers the condenser lens, said lens having a convexity such that the light is directed at a substantially increased angle to the light axis as it leaves the lens from that at which it is converged upon the lens in a converging path the apex of which is in close proximity to the posterior element of the projection lens.

3. A projector comprising in combination, a picture support, a projection lens spaced therefrom, a light source, and means for directing the light from said source through the picture to the posterior element of the projection lens, said means comprising at least two condenser lenses, two of which are of substantially different diameters, the diameter of at least one of said condenser lenses which is installed in the projector rearward, toward the light source, being substantially larger than another condenser lens installed frontward, toward the picture frame, the rear lens acting to concentrate the light from said source on the entire surface of the frontward lens and the frontward lens acting to converge the light at an increased angle to the light ax's upon the projection lens the convexity of said condenser lenses being such that they direct the light in a converging path from the entire area of the picture to an apex substantially at the surface of the posterior element of the projection lens.

4. A projector comprising in combination, a picture support, a projection lens spaced therefrom, a light source, and means for directing the light from said source through the picture to the posterior element of the projection lens, said means comprising at least two condenser lenses, two of which are air-spaced more than two inches apart, both installed and mounted, in parallel manner, in the axis of said projection lens, with at least one of said condenser lenses placed, and removably secured, in close juxtaposition to the picture on the side of the picture toward the light, the rearward lens being substantially larger than the front ward lens and converging the light thereon the convexity of the condenser lenses being such that they direct the light in a converging path from the entire area of the picture to an apex substantially at the surface of the posterior element of the projection lens.

GEORGE THEODORE JOHNSON.

REFERENCES CITED

The following references are of record in the file of this patent:

UNITED STATES PATENTS

| Number | Name | Date |
|---|---|---|
| 1,143,287 | Kohler | June 15, 1915 |
| 1,621,741 | Kellner | Mar. 22, 1927 |
| 1,630,616 | Hill | May 31, 1927 |
| 1,700,252 | Cox | Jan. 29, 1929 |
| 1,709,017 | Hill | Apr. 16, 1929 |
| 1,750,910 | Stark | Mar. 18, 1930 |
| 2,225,485 | Rantsch | Dec. 17, 1940 |